United States Patent [19]

Welp et al.

[11] Patent Number: 4,634,269
[45] Date of Patent: Jan. 6, 1987

[54] FILM CARD CAMERA AND PROCESS FOR MANUFACTURING DUPLICATE FILM CARDS

[75] Inventors: Ullrich Welp, Bad Nauheim; Willi Kramer, Bad Vilbel; Michael Girke, Bad Nauheim; Bernd Lack, Friedberg, all of Fed. Rep. of Germany

[73] Assignee: Dr. Welp Entwicklungs-KG, Fed. Rep. of Germany

[21] Appl. No.: 762,851

[22] Filed: Aug. 6, 1985

[30] Foreign Application Priority Data

Aug. 9, 1984 [DE] Fed. Rep. of Germany ....... 3429296
Sep. 5, 1984 [DE] Fed. Rep. of Germany ....... 3432617
May 7, 1985 [DE] Fed. Rep. of Germany ....... 3516265

[51] Int. Cl.[4] .............................................. G03B 27/30
[52] U.S. Cl. ........................................ 355/100; 355/19
[58] Field of Search ...................... 355/19, 40, 43, 100

[56] References Cited

U.S. PATENT DOCUMENTS 3,535,039 10/1970 Lakin et al. .......................... 355/100
3,688,656 9/1972 Applequist et al. .............. 355/19 X
4,185,913 1/1980 Ammann et al. ...................... 355/43

*Primary Examiner*—Richard A. Wintercorn
*Attorney, Agent, or Firm*—Wegner & Bretschneider

[57] ABSTRACT

In a film card camera the processing unit is not only employed for developing the original film cards exposed in the film card camera but also for developing duplicate cards. The duplicate cards are preferably exposed and developed in a contact-exposure unit of the film card camera, employing the film card original generated in the film card camera. The film card camera can also be of the CAD-type. Its processing unit is in this case employed for generating original film cards as well as for manufacturing duplicate film cards. In addition, both types of cards can be labeled.

22 Claims, 3 Drawing Figures

FILM CARD CAMERA AND PROCESS FOR MANUFACTURING DUPLICATE FILM CARDS

BACKGROUND OF THE INVENTION

The invention relates to a process for manufacturing a film card duplicate. Furthermore the invention relates to two different film card cameras for carrying out said process.

Film card duplicates are required in a considerable number of cases. A drawing office with an aperture card installation cannot benefit fully from it unless the information contained in the cards-usually drawings, parts lists and patent specifications-reaches the respective destinations as quickly as possible after the cards are produced. For that reason sets of cards are made from every original in quantities as demanded by the distribution list. The average number in the majority of drawing offices is 3–5 cards per document. Only a few of the larger concerns, e.g. the motor industry have a considerably higher distribution. As an example: Opel normally produce 30 duplicate cards from each drawing, VW over 60 and BMW even up to 70.

As a rule a set of cards consists of one original card and two to four diazo duplicate cards. Producing such a set requires a camera and a duplicator needing two separate operations. More importantly, two different kinds of film, each processed differently, are being used: In the original card the silver film stores the image with high resolution and even density. Duplicate cards are then copies from the original card whereby a loss in quality can occur, depending on the quality of the duplicating device and of the diazo film. Those who do not want to risk a loss of quality in their duplicate cards, partly only noticeable after several years, will produce their card sets entirely on silver film cards. Many companies, especially in the USA and in England, have for years specified multiple exposures by rollfilm camera of each document onto silver film with subsequent mounting on cards. Although this produces a better quality negative, it is time-and labor-consuming, and the risk of imprecise mounting remains.

Rational application of graphic data storage (GDS) on film aperture cards in technical offices requires the means for producing duplicate cards at any time, even from single cards. When the original drawings are destroyed or when, as often happens with satellite archives, the entire archive consists of film cards, these have completely taken the place of the originals. Duplicate cards are, therefore, a very important part of GDS.

To date the duplicate cards have been manufactured on the basis of the diazo process in the form of diazo card duplicates by means of diazo copiers. Diazo copiers consist of an ultraviolet contact-exposure unit, a $NH_3$ processing unit and of the associated isolating devices and transporting means. Diazo card duplicates have the shortcoming that a quick loss in density occurs when frequently used in reading or magnifying devices or when improperly stored, e.g., when subjected to ultraviolet light or too high temperatures. This results in a considerable deterioration of their suitability for being read and copied. They then become unusable for many purposes, e.g., for automatic magnification.

When installing microfilm systems, e.g., for storing drawings, the expensive diazo copies have to date had to be bought in addition to the film card camera. This constitutes an additional capital expenditure and the introduction of a technologically different working process. Insufficient use is made of this additional expenditure when only a small number of card duplicates is required per day.

Recently increasing use is made of the computer aided design (CAD) computer when generating drawings. CAD cameras with cathode rays or a laser beam render it possible to expose a microfilm by means of the rays or the beam on the basis of a computer routine in such a manner that a computer-generated drawing is stored on the microfilm after processing is completed. Also these CAD cameras generate microfilm cards, card duplicates of which have as a rule to be manufactured.

SUMMARY OF THE INVENTION

It is a primary object of this invention to provide a process for manufacturing durable film card duplicates which can be carried out with a minimum of equipment expenditure and at low cost.

It is another object of this invention to provide cameras for carrying out the process.

These objectives are accomplished according to the invention in that a reversal-type silver-emulsion film is used as a duplicating film and in that processing said reversal film is carried out in the processing unit of a film card camera.

In this process according to the invention the processing unit and the transporting means that already exist in a prior art film card camera are also employed for processing duplicate film cards. The camera is assembled, or retrofit, with certain additional elements to enable its selective use in making duplicate cards as well as originals. This obviates the need of buying an additional expensive device. Hence, it is possible to manufacture duplicate film cards with much less equipment and cost expenditure than with diazo copiers. In this case a superior quality and durability of the duplicate cards, which corresponds to the original cards, is obtained.

The camera is designed to be capable of transporting the duplicate card exposed separately from the optical exposure of the camera unit to the processing unit. A camera of this type can be created by means of simple modification of a conventional camera such as that sold as the Microbox SLK-O card camera by Microbox Dr. Welp GmbH & Co. of Bad Nauheim, West Germany. Developing and manufacturing this type of camera is rendered economical when making use of component parts and assemblies already existing.

The camera preferably has an additional lead-in for film cards to be duplicated and a contact-exposure unit for exposing the duplicate cards in the camera. The entire duplicating process can take place in the camera head of a camera of this type. This eliminates any danger of film cards not yet exposed to be subjected to light.

A further preferred embodiment of the invention provides for the contact-exposure unit and the additional lead-in to be located in a separate housing that is capable of being attached to the camera. Such an embodiment offers the advantage that even without the separate housing the camera can be employed for solely generating original film cards. When installing and operating a microfilm system no separate equipment and no material working on a different principle need to be bought additionally for purposes of duplicating.

A conventional film card camera need only be slightly modified, in order to obtain the features of this invention, when an insert with the unexposed duplicate cards, the lead-in and a positioning device for the film card to be duplicated can be inserted into the lead-in for the unexposed film cards.

It is furthermore preferred to provide an automatic density scanner positioned between the processing unit and the film card lead-out. This results in a much faster and superior quality check of the duplicate cards than known to date.

As in the case with the processing unit, the density scanner is employed for the original film cards as well as for the duplicate cards.

It is of further advantage when provision is made of a labeling unit for labeling the film card in the film card camera. Such a labeling unit renders it possible to label the original film cards as well as the duplicate cards. Just as the processing unit, the transporting means and the checking unit, the labeling unit of a camera of this type is used in two ways.

A further preferred embodiment of the invention provides for the labeling unit to have one needle printer on each side of the film card. A correctly-positioned labeling of the duplicate cards of every even-numbered generation is also rendered possible by a film card camera of this type.

Said labeling unit can be designed with special simplicity, when it is capable of labeling the head-band of a film card. Experience has shown that it is possible to store more than the entire information contained in the perforation of a punched card employed to date on the head-band when making use of machine-readable characters.

The lettering need not be preset for each new duplicating process when the film card camera has a reading head.

Since, contrary to the original film cards, the duplicate cards have to be labeled on the emulsion side and since contact exposure has to take place emulsion to emulsion, the necessity arises to label the duplicate cards from below and the original film cards from above in the labeling unit, which is rendered possible by the provision of two printing elements in the film card camera described hereinbefore. The additional printing element renders the film card camera substantially more expensive compared with a film card camera without the possibility of manufacturing card duplicates. This additional expenditure can, however, be saved, when another embodiment of the invention provides for the labeling unit being positioned between the lead-in for the unexposed film cards or duplicate cards and the contact-exposure unit, and when provision is made of a turning unit for the duplicate cards between the contact-exposure unit and the processing unit.

This feature of the invention renders it possible to insert duplicate cards with the emulsion side up into the lead in of the film card camera for purposes of duplicating. Since duplicate cards have to be labeled on the emulsion side, the original film cards, however, on the side opposite the emulsion side, one single printing element is sufficient in the film card camera according to the invention, said printing element labeling the film cards not yet exposed as well as the duplicate cards from above. Hence, manufacture of the film card camera is much more economical than that of a camera having two printing elements.

A further reduction of cost can be obtained when the lead-in for the film card or duplicate cards is designed to accommodate either a magazine with unexposed film cards or duplicate cards pointing upward, that of the film cards pointing downward.

Such an embodiment provides for the unexposed film cards as well as for the unexposed dupicate cardes to be capable of being pulled from the top of the card stack in the magazine by means of one single device that is required in any case, the unexposed film cards or unexposed duplicate cards subsequently being transported to the labeling unit first of all. Apart from the reduction in cost, the use of identical magazines results in the film card camera becoming even more compact.

The space available in conventional film card cameras is made maximum use of, when the contact-exposure unit is provided above the path of the film cards and when the lead-in for the film cards to be duplicated is correspondingly positioned on top of the film card camera. In addition to this advantage, operating the film card camera during duplicating can be effected with ease, when the film card originals to be duplicated can be inserted into the camera from the top and pulled out of it towards the top.

A further preferred embodiment of the invention provides for one arcuate guideway directed towards the contact-exposure unit for transporting the duplicate cards from the path of the film cards to the contact-exposure unit and another for transporting the film cards back again to the path of the film cards. Said guideways at the same time constitute a turning mechanism, since the duplicate cards are automatically turned over when moving up one guideway and moving down the other guideway, resulting in their emulsion side pointing downward again when entering the processing unit. It has, of course, to be safeguarded that the duplicate cards do not slide back into the same guideway when moving out of the contact-exposure unit, which can be effected by, for instance, a turning unit or in that the lower ends of the duplicate cards jump from the one guideway over to the other as a result of their inherent elasticity when moving up the one guideway.

A special advantage of these guideways functioning as a turning unit also rests with the duplicate cards always being guided at one of their standard edges.

Each film card to be duplicated can be manually inserted into the additional lead-in, with the film gate reaching into the contact-exposure unit, and can be manually pulled out again after completion of exposure when the contact-exposure unit is positioned so high in the film card camera that the film card to be duplicated reaches into or out of the additional lead-in with its cardboard-band pointing away from the film gate.

In order to render it impossible for the duplicate card to be pulled out by accident from the additional lead-in of the film card camera, it is expedient to provide a separating unit near the additional lead-in, with said separating unit bending the duplicate card to be exposed away from the film card to be duplicated at its cardboard band pointing away from the film gate.

When storing drawings on microfilms, it is in many cases clear from the beginning that a plurality of identical microfilm cards of silver film quality will be required. When storing drawings on microfilms, one can at once generate a plurality of consecutive microfilm cards, in order to generate several identical film card originals. This possibility is, however, not economical to carry out employing the means known to date with a CAD camera, since CAD copying of a drawing takes up to 15 minutes, depending on the size of the drawing and on the information density. In this case one is again forced to manufacture the duplicate cards in separate devices.

This expenditure can, however, be saved in the case of a CAD microfilm camera, when the camera is additionally provided with a contact-exposure unit for purposes of exposing duplicate cards and when the film card camera is equipped with transporting means for transporting the duplicate card from a card stack to the contact-exposure unit and from there to the film card lead-out.

A CAD microfilm camera of this design combines all required facilities in one single device. It is therefore especially easy to operate and economical. During copying of CAD drawings, silver duplicates of the cards can be manufactured, labeled and their density scanned. A card set can be put together while a laser beam or cathode ray copy of the next film card is being made. Automatic operation of the camera is possible without problems.

It is especially advantageous for the working sequence when the CAD microfilm camera is provided with two separate film card lead-outs, with one film card lead-out being provided for original film cards and one for duplicate cards.

With a CAD microfilm camera of this design, transport of the duplicate cards to the processing unit can be effected with little design expenditure when a turning unit is provided between the contact-exposure unit and the processing unit.

The original film cards as well as the duplicate cards can be labeled by one single labeling unit that has only one printing element when the labeling unit is positioned between the contact-exposure unit and the turning unit.

Checking the density of all film cards manufactured is possible when an automatic density scanner is provided between the processing unit and the turning unit.

BRIEF DESCRIPTION OF THE DRAWING

Several embodiments are possible on the basis of the invention. In order to exemplify their underlying design principle, three different microfilm cameras are shown in a strongly schematic representation in the drawing and will be described in the following.

FIG. 1 shows a housing 1 of a film card camera. A film card lead-in on the left hand side of the housing 1 is not illustrated in the drawing. An isolating unit 2, an optical exposure unit 4 with a lens 3, a processing unit 5 for silver films, a checking unit 6 with an automatic density scanner, a labeling unit 7 as well as a film card lead-out 8 are illustrated in a strongly schematic manner in the drawing. A film card entering the housing 1 is exposed in the exposure unit 4 and subsequently sprayed with a processing fluid from below in the processing unit 5, in this way being developed, fixed, rinsed and dried. The checking unit 6 positioned next contains an automatic density scanner and serves to determine the optical density.

Figure 1:
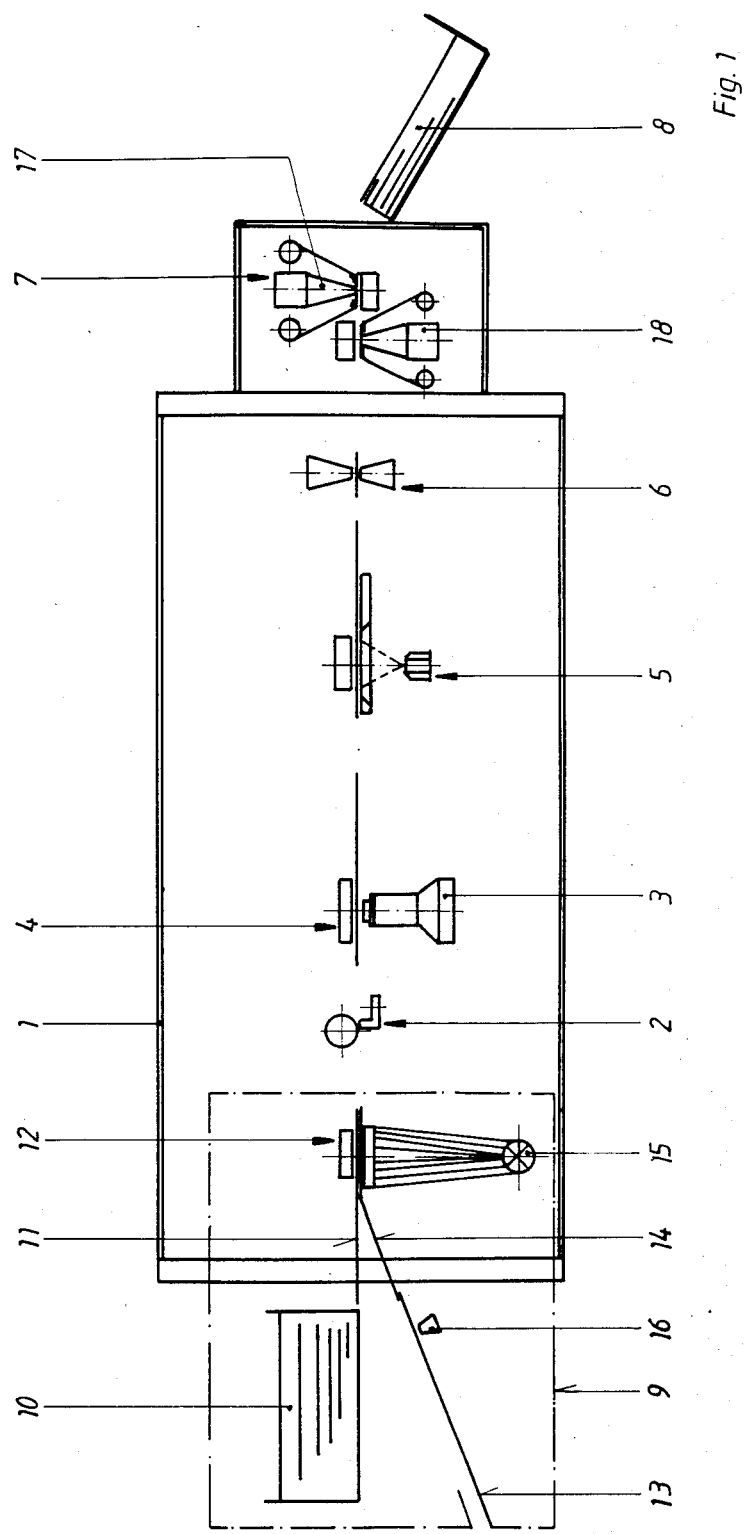
FIG. 1 is a first embodiment of a film card camera according to the invention.

The labeling unit 7 has one needle printer 17 or 18 on each side of the film card. Depending on what generation of duplicate cards is being processed, one of the needle printers 17 or 18 comes into action to apply a correctly-positioned label on the head-band of the respective film card.

An essential feature of the invention is an insert 9 which, instead of the film card magazine commonly used, is inserted into the housing of the film card camera with unexposed film cards from the left side. This insert 9 accommodates a film card magazine 10 from which individual duplicate cards 11 can be taken and transported to the contact-exposure unit 12. These duplicate cards are silver reversal film cards. The insert 9 furthermore has a lead-in 13 into which the respective original film card to be duplicated is inserted for each duplicating process. In the contact-exposure unit the original film card 14 and an unexposed duplicate card 11 are placed on top of each other emulsion to emulsion and are exposed by the light of a lamp 15 on the basis of the contact process.

Subsequently the duplicate card 11 passes through the individual units of the camera until it reaches the film card lead-out 8 in the same manner as during the manufacture of an original microfilm card, however, of course omitting renewed exposure in the optical exposure unit 4. The needle printer 18 is then employed to apply a correctly-positioned label on the duplicate card of the second generation. After contact exposure, the original film card 14 can be transported back to the lead-in 13.

It is also possible to provide a reading head 16 in the insert 9, the former reading the lettering on the film card originals, hence rendering it possible for the film card duplicates to be automatically labeled in the labeling unit 7 in correspondence to the film card originals.

Figure 2:
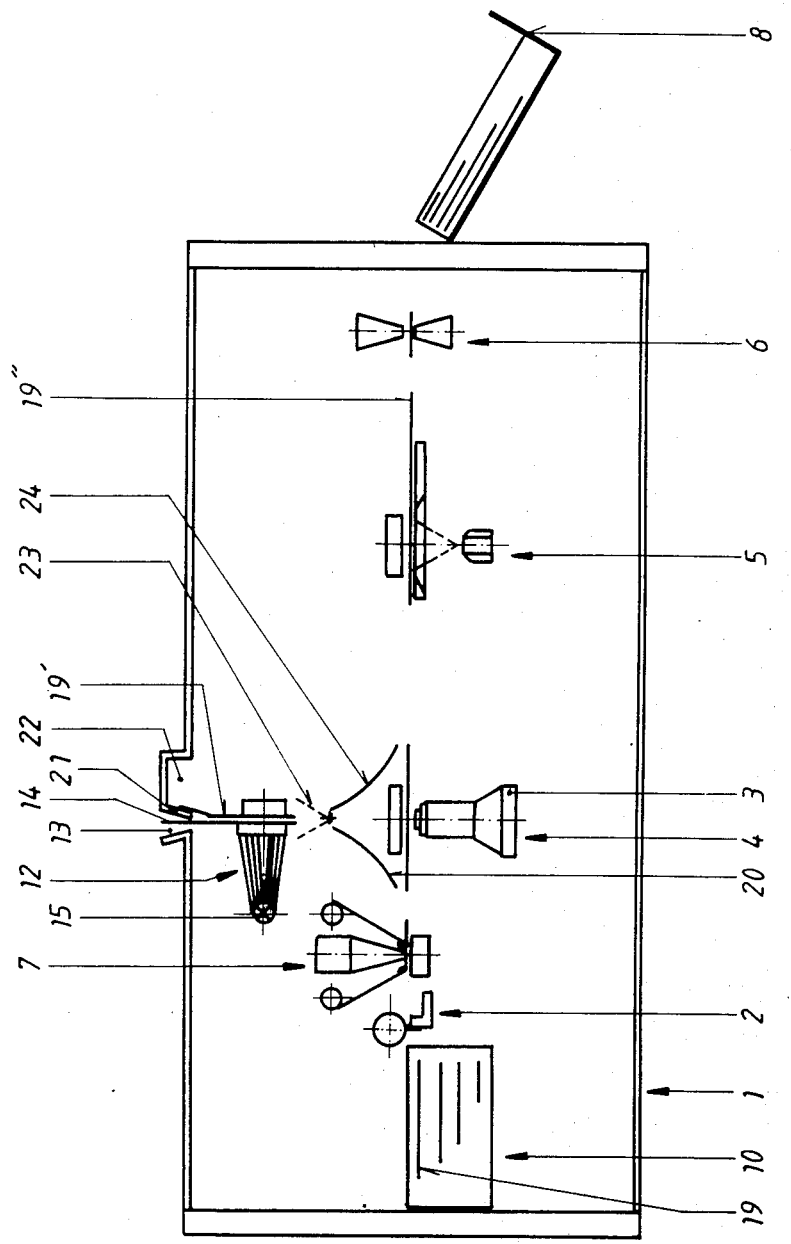
FIG. 2 is a second embodiment of a film card camera according to the invention.

Like the film card camera illustrated in FIG. 1, the film card camera illustrated in FIG. 2 has a housing 1 accommodating an isolating unit 2, an exposure unit 4 with a lens 3, a processing unit 5, a checking unit 6, a labeling unit 7 and a contact-exposure unit 12. Said contact-exposure unit 12 is equipped with a lamp 15 for purposes of transilluminating a original film card 14 which is to be inserted into a lead-in 13 and to be duplicated in the film card camera.

A magazine 10 is inserted into the film camera from the left. If a duplicating process is to be carried out with the film card camera, the magazine 10 holds duplicate cards 19, with the emulsion side of the latter pointing upward. When the film card camera is to be used for the generation of original film cards, an identical magazine 10 holding unexposed film cards is to be inserted into the camera, with the emulsion side of the film cards pointing downward.

The isolating unit 2 already mentioned, which is designed to take one single duplicate card 19 or an unexposed film card from the magazine 10, is positioned behind the magazine 10. Contrary to the embodiment of FIG. 1, the labeling unit 7, where duplicate cards 19 as well as film cards can be labeled by one single printing element from above, is positioned directly behind said isolating unit 2.

After having passed the labeling unit 7, the duplicate cards 19 are transported upward to the contact-exposure unit 12 by means of an arcuate guideway 20. Said contact-exposure unit is positioned above the exposure unit 4 and below the lead-in 13. The duplicate card 19 is transported into the contact-exposing unit 12 with its emulsion side pointing to the left in a manner that renders it possible for its cardboard band pointing away from its film gate to be bent towards the right by a separating unit 21 until the duplicate card 19 reaches into an upper recess 22 of the housing 1.

During contact exposure the original film card to be duplicated reaches into or out of the lead-in 13 with its cardboard band, so that it can be manually gripped.

When contact exposure has been completed, the duplicate card 19' is transported to the guideway 24 by means of a turning unit 23 or in any other manner, with said guideway 24, which is symmetrical to the guideway 20, also being arcuate and leading back to the path of the film cards. This results in the emulsion side of the duplicate card 19" pointing downward when the card is in the processing unit 5, so that the duplicate card can be developed, fixed, rinsed and dried in the manner of an original film card. After having passed the checking unit 6, the duplicate card 19, 19', 19" is transported to the film-card lead-out on the right side of the film-card camera.

Figure 3:
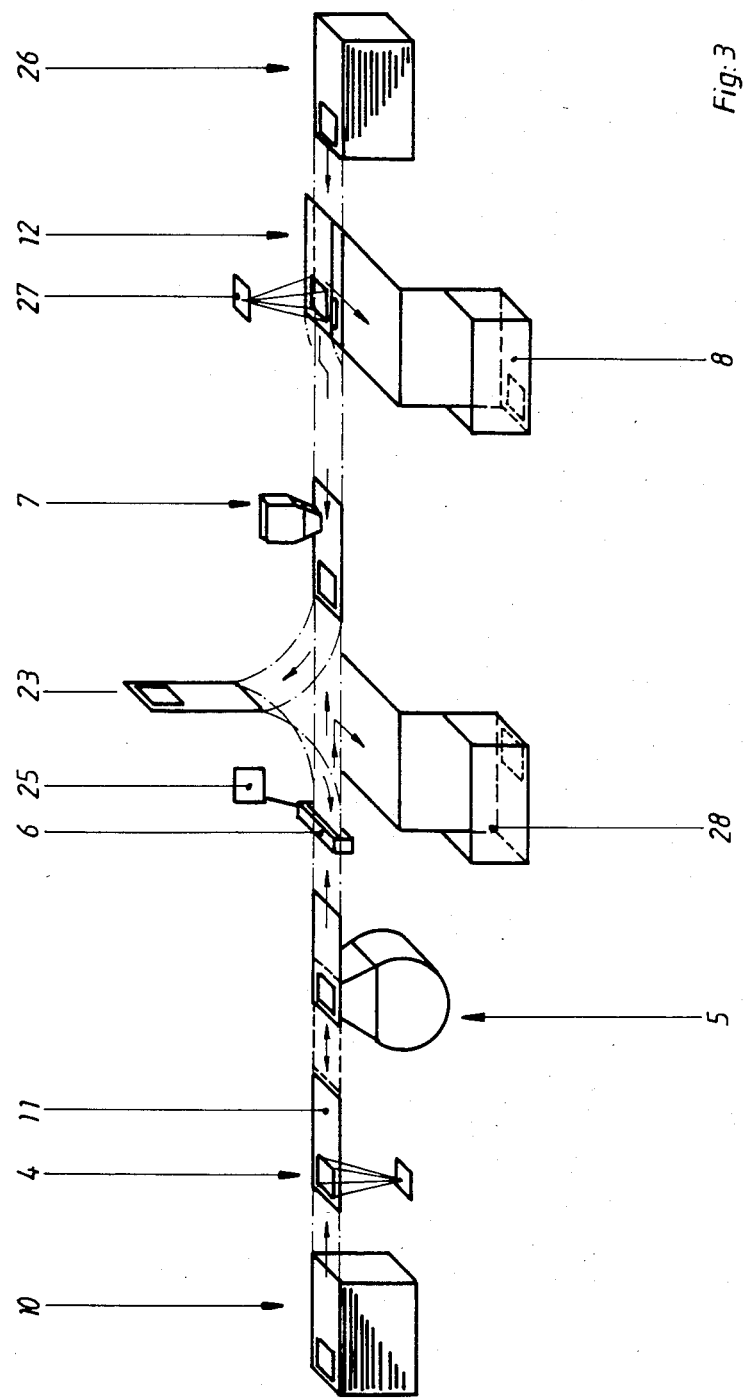
FIG. 3 is a film card camera according to the invention designed as a CAD film card camera.

FIG. 3 shows a CAD microfilm camera. With said camera, drawings are not photographed but exposed in the exposure unit 4 by means of a computer-controlled laser beam or cathode ray, after a film card 14 has been fed from a film card magazine 10 to the exposure unit 4. After this, the film card 14 is transported to the processing unit 5 where it is developed, fixed, rinsed and dried. Subsequently it glides to the checking unit 6 where its optical density is determined. The value obtained is immediately digitally displayed on a display unit 25. If the density of the negative is not within the adjustable maximum or minimum values, this can be indicated by an audible signal. In this way, the operator becomes aware of the deviation and can intervene. Then the film card 11 passes below the labeling unit 7.

In this labeling unit 7, the film card's upper band is labeled with machine-readable OCR characters, so that the contents of the film-card image can be recognized from this lettering.

For purposes of duplicating, the film-card 11 glides to the contact-exposure unit 12 where it comes to a stop with its emulsion side up. A duplicate card is transported from a stack 26 which contains unexposed duplicate cards to the contact-exposure unit 12, with the duplicate card being positioned below the original card and with the emulsion side of the duplicate card pointing upward. After having been exposed by a source of light 27, the exposed duplicate card passes below the labeling unit 7 where it is labeled, with the text and the labeling position being identical to that of the original film card labeled before. Then it glides over a turning unit 23 that serves to transfer the cards from one guide to the other. There it is first of all brought into a vertical position, turned and transported to the processing unit 5. In this processing unit 5 it is processed in the same manner as an original film card. Subsequently it moves through the checking unit 6 and to a lead-out 28 for duplicate cards. After exposure of the duplicate cards has been completed, the original card 11 moves to the film-card lead-out 8.

It is not illustrated that the CAD microfilm camera such as shown in FIG. 3 can have an additional lead-in, as can the microfilm cameras described before. Said lead-in renders it possible that the CAD microfilm camera can be employed for duplication of film-cards generated in a different camera. In addition an OCR reading unit can be provided, in order to render it possible for duplicate cards to be labeled.

What is claimed is:

1. A film card camera for making either an original film card or a duplicate film card, which comprises a lead-in for unexposed film cards, an optical exposing unit with a leans for exposing the original film card, a processing unit, a film card lead-out, means for exposing a duplicate film card through an original film card separate from the optical exposing unit, and means to transport the exposed duplicate film card to the processing unit.

2. A film card camera for making either an original film card or a duplicate film card which comprises a lead-in for unexposed film cards, an optical exposing unit with a lens, a processing unit, a film card lead-out, means for exposing a duplicate film card separate from the optical exposing unit, means to transport the exposed duplicate film card to the processing unit, and has an additional lead-in for film cards to be duplicated, said means for exposing a duplicate film card being a contact-exposure unit.

3. A film card camera according to claim 2, wherein the contact-exposure unit and the additional lead-in are provided in a separate housing that can be attached to the camera.

4. A film card camera according to claim 2, further comprising a turning mechanism for the duplicate film cards disposed between the contact exposure unit and the processing unit.

5. A film card camera according to claim 4, wherein the lead-in for the film cards or duplicate cards is designed to accommodate a magazine with either unexposed film cards or duplicate cards as desired, with the photographic emulsion of the duplicate cards pointing upward and the photographic emulsion of the film cards pointing downward.

6. A film card camera according to claim 4 or 5, wherein the contact exposure unit is disposed above the path of the film cards and the lead-in for the film cards to be duplicated is correspondingly positioned on the top of the film card camera.

7. A film card camera according to claim 4 or 5, further comprising an arcuate guideway directed towards the contact exposure unit for transporting the duplicate cards from the path of the film cards to the contact exposure unit and another arcuate guideway for transporting the duplicate cards back to the path of the film cards.

8. A film card camera according to claim 4, wherein the contact exposure unit is positioned high enough in the film card camera for the film card to be duplicated reaching into or out of the additional lead-in with its cardboard band pointing away from the film gate during contact exposure.

9. A film card camera according to claim 4, further comprising a separating device disposed in close proximity to the additional lead-in to bend the unexposed film card duplicate away from the film card to be duplicated at the cardboard band of the unexposed film card duplicate pointing away from the film gate.

10. A film card camera according to claim 4, further comprising a labeling unit between the lead-in for the unexposed film cards or duplicate cards and the contact-exposure unit.

11. A film card camera for making either an original film card or a duplicate film card which comprises a lead-in for unexposed film cards, an optical exposing unit with a lens, a processing unit, a film card lead-out, means for exposing a duplicate film card separate from the optical exposing unit, means to transport the exposed duplicate film card to the processing unit, and an insert adapted to be inserted into the lead-in for the unexposed film cards, with said insert holding the unexposed duplicate cards and having a lead-in and positioning means for the original film card to be duplicated.

12. A film card camera for making either an original film card or a duplicate film card which comprises a lead-in for unexposed film cards, an optical exposing unit with a lens, a processing unit, a film card lead-out, means for exposing a duplicate film card separate from the optical exposing unit, means to transport the exposed duplicate film card to the processing unit, and an automatic density scanner disposed between the processing unit and the film card lead-out.

13. A film card camera for making either an original film card or a duplicate film card which comprises a lead-in for unexposed film cards, an optical exposing unit with a lens, a processing unit, a film card lead-out, means for exposing a duplicate film card separate from the optical exposing unit, means to transport the exposed duplicate film card to the processing unit, and a labeling unit for the film card.

14. A film card camera according to claim 13, wherein the labeling unit comprises one needle printer on each side of the film card.

15. A film card camera according to claim 13, wherein the labeling unit is designed to label the headband of a film card.

16. A film card camera according to claim 13, further comprising a reading head for reading the lettering on the film card originals is provided.

17. A film card camera for making either an original film card or a duplicate film card which comprises a lead-in for unexposed film cards, a CAD exposure unit, a processing unit, a film card lead-out, a contact-exposure unit for exposing duplicate cards, a first film card lead-out for original film cards, a second film card lead-out for duplicate cards, and transporting means for transporting the duplicated card from a card stack to the contact-exposure unit, from there to the processing unit and subsequently to the second film card lead-out.

18. A film card camera according to claim 17 further comprising a turning unit disposed between the contact-exposure unit and the processing unit.

19. A film card camera for making either an original film card or a duplicate film card which comprises a lead-in for unexposed film cards, a CAD exposure unit, a processing unit, a film card lead-out, a contact exposure unit for exposing duplicate cards, transporting means for transporting the duplicate card from a card stack to the contact-exposure unit, from there to the processing unit and subsequently to the film card lead-out, and a turning unit disposed between the contact-exposure unit and the processing unit.

20. A film card camera for making either an original film card or a duplicate film card which comprises a lead-in for unexposed film cards, a CAD exposure unit, a processing unit, a film card lead-out, a contact-exposure unit for exposing duplicate cards, transporting means for transporting the duplicate card from a card stack to the contact-exposure unit, from there to the processing unit and subsequently to the film card lead-out, and a labeling unit disposed between the contact-exposure unit and the turning unit.

21. A film card camera for making either an original film card or a duplicate film card which comprises a lead-in for unexposed film cards, a CAD exposure unit, a processing unit, a film card lead-out, a contact-exposure unit for exposing duplicate cards, transporting means for transporting the duplicate card from a card stack to the contact-exposure unit, from there to the processing unit and subsequently to the film card lead-out, and a checking unit with an automatic density scanner disposed between the processing unit and the turning unit.

22. A film card camera for making either an original film card or a duplicate film card, which comprises a lead-in for unexposed film cards, a CAD exposure unit for exposing the original film card, a processing unit, a film card lead-out, a contact exposure unit for exposing duplicate cards, and transporting means for transporting the duplicate card from a card stack to the contact-exposure unit, from there to the processing unit and subsequently to the film card lead-out.

* * * * *